(No Model.)

H. A. AHNER.
MACHINE FOR KEEPING GRAVEL PATHS, &c., IN ORDER.

No. 469,382. Patented Feb. 23, 1892.

WITNESSES:
Wm. D. Bell
E. L. Sherman

INVENTOR
Hermann A. Ahner
BY
Gartner & Co.
ATTORNEYS

United States Patent Office.

HERMANN ADOLPH AHNER, OF MEINERSDORF, GERMANY.

MACHINE FOR KEEPING GRAVEL PATHS, &c., IN ORDER.

SPECIFICATION forming part of Letters Patent No. 469,382, dated February 23, 1892.

Application filed September 4, 1891. Serial No. 404,724. (No model.)

*To all whom it may concern:*

Be it known that I, HERMANN ADOLPH AHNER, a subject of the King of Saxony, residing at Meinersdorf, in the Kingdom of Saxony, Germany, have invented certain new and useful Improvements in Machines for Keeping Gravel Paths in Parks and Gardens in Order and for Removing Growing Weeds and Grass Therefrom; and I do hereby declare the following to be a full, clear, and exact description of said invention.

The object of this invention is to provide a simple, reliable, and ready machine for digging up or removing grass or weeds from paths or walks in parks, gardens, or similar places, economical in construction and easily operated.

The invention consists in the improved weed or grass removing machine and the combination and arrangement of the various parts thereof, substantially as will be hereinafter more fully described, and finally embodied in the claim.

Figure 1:
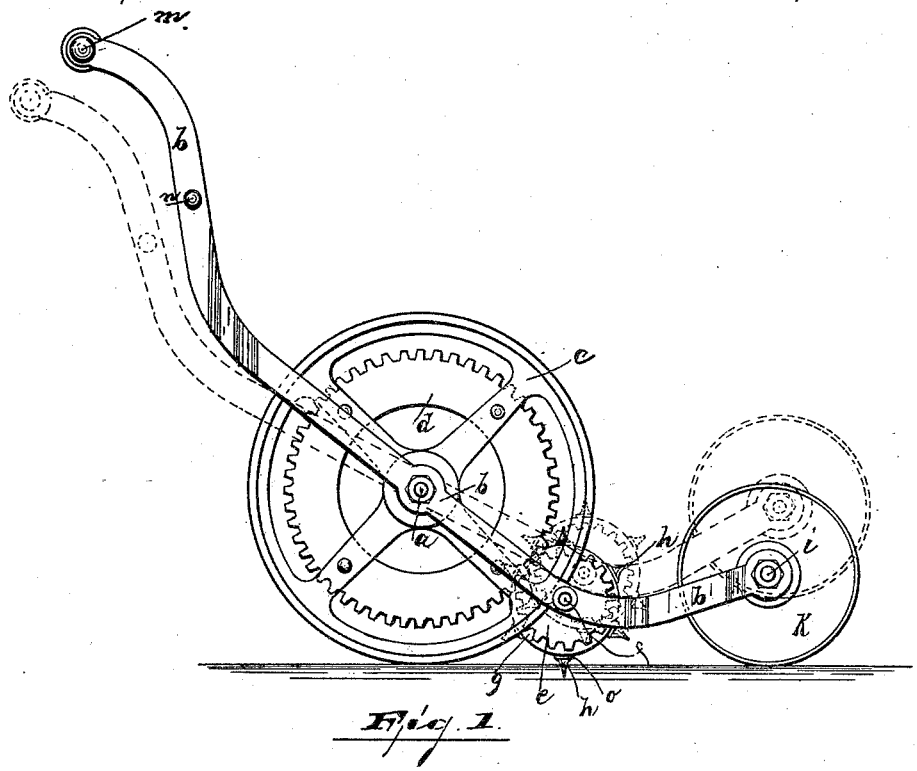
Figure 2:
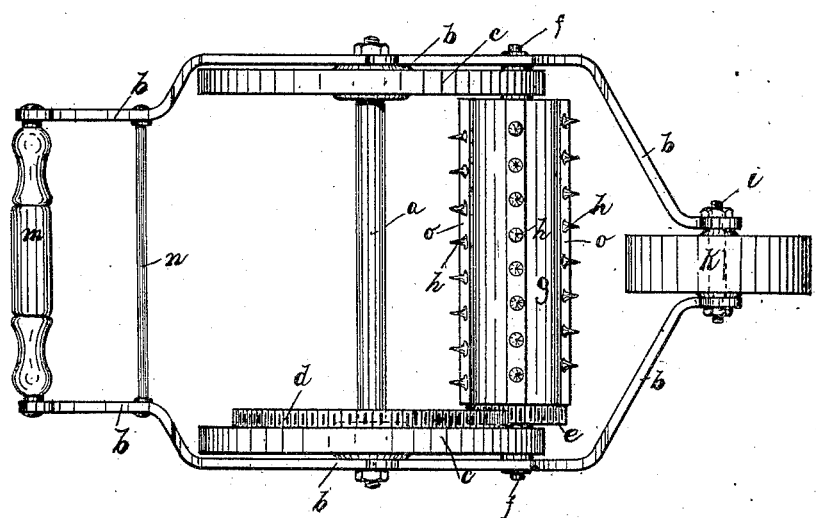

Referring to the accompanying drawings, in which like letters of reference indicate corresponding parts in each of the several figures, Figure 1 is a side elevation of my improved removing-machine. Fig. 2 is a top plan view of the same.

In said drawings, $a$ represents a main shaft, on the ends of which is pivoted a frame $b$. On the shaft $a$ and within the sides of the frame are secured feeding or propelling wheels $c$ $c$. On the same shaft and on the outside of one of the propelling-wheels is secured a gear-wheel $d$, meshing into a pinion $e$, secured on a shaft $f$, adapted to revolve in bearings in the frame $b$ in front of the shaft $a$. Upon the shaft $f$ and within the frame $b$ is secured a drum or cylinder $g$, on the outer periphery of which are secured in any desired manner bands or strips $o$, on which are secured outwardly-projecting teeth or points $h$. The forward ends of the frame $b$ are contracted inwardly and are held together by a bolt or pin $i$. Upon this bolt or pin and within the ends of the frame is arranged a steering or guide wheel $k$. Between the rear ends of the frame $b$ is arranged a handle $m$. The sides of the frame at the rear of the wheels $c$ can be further strengthened or supported, when desired, by a brace $n$.

In operation as the machine is pushed forward the wheels $c$, resting on the ground, turn the shaft $a$, and with it the gear-wheel $d$, causing the drum, with the teeth, to revolve, and when the handle of the frame is held upward, as shown in Fig. 1, the teeth will dig into the ground and loosen and uproot all weeds or grass in its course. When it is not desired to have the teeth enter the ground, the handle is depressed and the frame turns on its pivot, raising the drum and its shaft, as shown in dotted lines in Fig. 1.

Having thus described my invention, what I claim as new, and desire to secure by Letters Patent, is—

In a machine for uprooting weeds or grass, the combination, with the frame and handle, of a driving-shaft, feed-wheels secured to said shaft, a gear-wheel secured to one of said feed-wheels, a drum-shaft pivoted in said frame, longitudinal strips on the outer periphery of the drum, rooting-teeth projecting outwardly from said strips, a gear-wheel on said drum-shaft, adapted to mesh into the gear-wheel on the driving-shaft, and a guiding-wheel pivoted in said frame forward of the drum-shaft, substantially as described and set forth.

In witness whereof I have hereunto signed my name in the presence of two subscribing witnesses.

HERMANN ADOLPH AHNER.

Witnesses:
W. P. BOYD,
R. E. JAHN.